(12) United States Patent
Paras Ram et al.

(10) Patent No.: US 12,159,520 B2
(45) Date of Patent: Dec. 3, 2024

(54) SECURITY ECOSYSTEM

(71) Applicant: MOTOROLA SOLUTIONS, INC., Chicago, IL (US)

(72) Inventors: Anoop Sehgal Paras Ram, Ipoh (MY); Kok Hong Soon, Georgetown (MY); Zehong Au, Georgetown (MY); Woei Chyuan Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 58 days.

(21) Appl. No.: 17/806,095

(22) Filed: Jun. 9, 2022

(65) Prior Publication Data
US 2023/0401944 A1 Dec. 14, 2023

(51) Int. Cl.
*G08B 13/196* (2006.01)
*G06F 3/04847* (2022.01)
*G06F 9/451* (2018.01)
*H04N 7/18* (2006.01)

(52) U.S. Cl.
CPC ... *G08B 13/19691* (2013.01); *G06F 3/04847* (2013.01); *G06F 9/453* (2018.02); *H04N 7/181* (2013.01)

(58) Field of Classification Search
None
See application file for complete search history.

(56) References Cited

U.S. PATENT DOCUMENTS

| | | | |
|---|---|---|---|
| 8,386,288 B2 | 2/2013 | Ananian et al. | |
| 10,338,973 B2 | 7/2019 | Jubinski et al. | |
| 10,440,018 B2 * | 10/2019 | Drake, II | H04L 63/105 |
| 11,017,341 B2 * | 5/2021 | Gentilhomme | G06Q 10/06316 |
| 2007/0116013 A1 * | 5/2007 | Brown | H04L 67/535 370/395.53 |
| 2007/0255607 A1 * | 11/2007 | Staby | G06Q 10/0633 705/7.26 |
| 2010/0305997 A1 * | 12/2010 | Ananian | G06Q 10/0633 715/843 |
| 2013/0090963 A1 * | 4/2013 | Sharma | G06Q 10/063112 705/7.13 |
| 2016/0191265 A1 * | 6/2016 | Cohn | H04W 76/50 340/514 |
| 2017/0344921 A1 * | 11/2017 | Leonelli | H04W 4/50 |
| 2018/0124098 A1 * | 5/2018 | Carver | G06N 20/00 |
| 2018/0227418 A1 * | 8/2018 | Segalis | G06F 40/20 |
| 2018/0307384 A1 * | 10/2018 | Garrison | G06Q 10/04 |
| 2019/0014153 A1 * | 1/2019 | Lang | H04L 63/20 |
| 2019/0129762 A1 * | 5/2019 | Stevens | G06N 5/02 |
| 2019/0279445 A1 * | 9/2019 | Gallagher | G07C 9/25 |
| 2019/0324968 A1 | 10/2019 | Kelly et al. | |
| 2020/0192319 A1 * | 6/2020 | Ong | G10L 17/22 |
| 2020/0267222 A1 | 8/2020 | Phipps et al. | |
| 2020/0301678 A1 * | 9/2020 | Burman | G06F 9/541 |
| 2020/0380962 A1 * | 12/2020 | Pavlou | G10L 15/22 |
| 2021/0226947 A1 * | 7/2021 | Frankston | H04L 63/107 |
| 2021/0374201 A1 * | 12/2021 | Wu | G06F 18/24143 |
| 2022/0067270 A1 * | 3/2022 | Tan | G06F 16/338 |
| 2022/0116242 A1 * | 4/2022 | Cohn | G08B 29/02 |
| 2023/0021355 A1 * | 1/2023 | Kraplanee | G06F 21/6245 |

* cited by examiner

*Primary Examiner* — Tamara T Kyle
*Assistant Examiner* — Koorosh Nehchiri

(57) ABSTRACT

A system, method, and apparatus for implementing workflows across multiple differing systems and devices is provided herein. During operation a workflow is automatically modified, or a new workflow generated, based upon user queries made after a workflow has been executed.

5 Claims, 12 Drawing Sheets

102

SECURITY ECOSYSTEM

BACKGROUND OF THE INVENTION

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system will have to be configured to provide the notifications to the radios and the video security system will have to be configured to provide the notifications to the radios. Thus, both the access control system and the video security system will need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem will be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool provides suggested changes to workflows in order to provide users with important information upon the execution of a workflow.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a system, method, and apparatus for implementing workflows across multiple differing systems and devices is provided herein. During operation a workflow is automatically modified, or a new workflow generated, based upon user queries made after a workflow has been executed.

Expanding on the above, assume that a workflow has an action that involves notifying a user of an event (trigger). If the workflow is executed, any information requested by the user will be utilized to modify (or suggest a modification to) the workflow so that the information requested by the user will automatically be provided to users upon subsequent execution of the workflow. For example, assume that a workflow comprises a trigger of "loitering detected at door 4", and an action of "notify security team A". Assume that the trigger has been detected, and that security team A has been notified of the loitering. If someone belonging to security team A requests more information on the detected trigger (e.g., requests a number of individuals detected by door 4), a suggestion will be made to modify the trigger to automatically provide this information upon subsequent execution of the workflow.

Figure 1A:
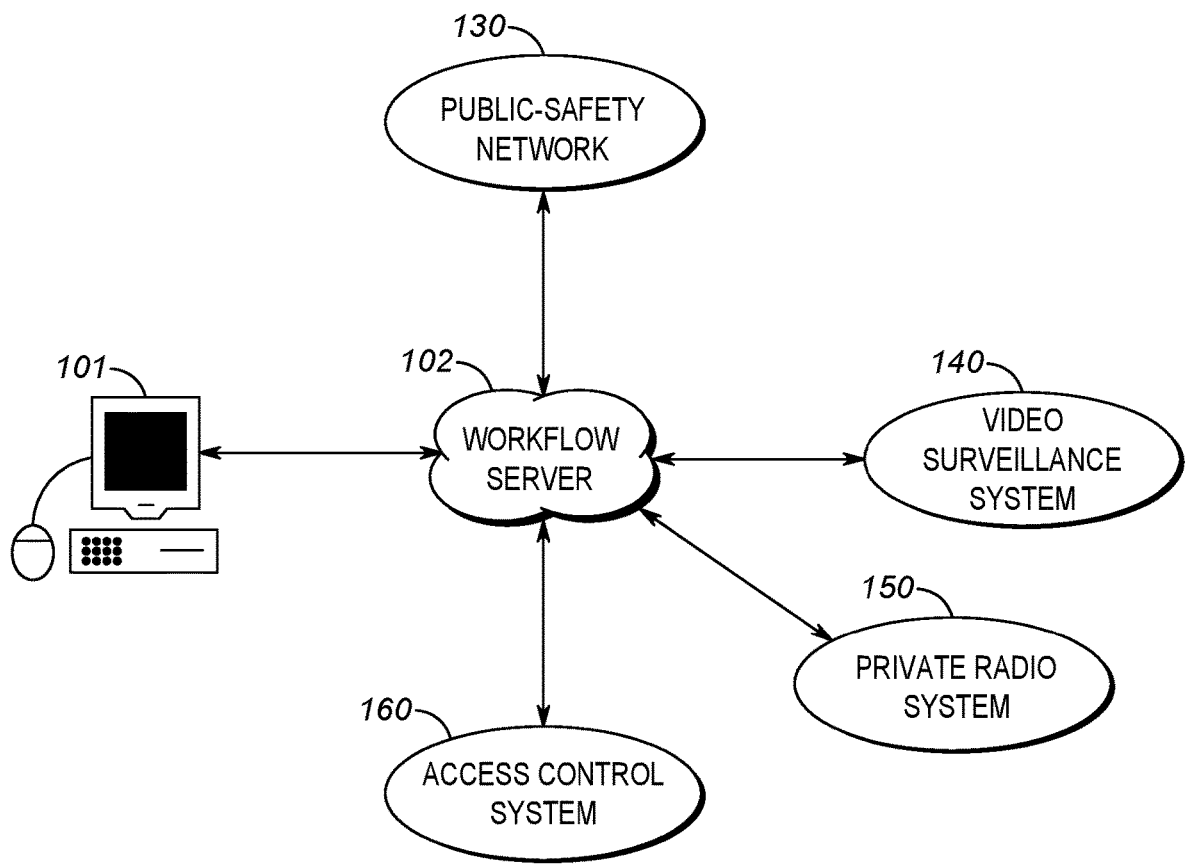
FIG. 1a illustrates a security ecosystem capable of configuring and automating workflows.

Turning now to the drawings, wherein like numerals designate like components, FIG. 1a illustrates security ecosystem 100 capable of configuring and automating workflows across multiple systems. As shown, security ecosystem 100 comprises at least public-safety network 130, video surveillance system 140, private radio system 150, and access control system 160. Workflow server 102 is coupled to each system 130, 140, 150, and 160. Workstation 101 is shown coupled to workflow server 102, and is utilized to configure server 102 with workflows created by a user. It should be noted that although the components in FIG. 1 are shown geographically separated, these components can exist within a same geographic area, such as, but not limited to a school, a hospital, an airport, a sporting event, a stadium, . . . , etc. It should also be noted that although only networks and systems 130-160 are shown in FIG. 1a, one of ordinary skill in the art will recognize that many more networks and systems may be included in ecosystem 100.

Workstation 101 is preferably a computer configured to execute Motorola Solutions' Orchestrate™ and Ally™ dispatch and incident management software. As will be discussed in more detail below, workstation 101 is configured to present a user with a plurality of triggers capable of being detected by systems 130-160 as well as present the user with a plurality of actions capable of being executed by systems 130-160. The user will be able to create workflows and upload these workflows to workflow server 102 based on the presented triggers and actions.

Workflow server 102 is preferably a server running Motorola Solutions' Command Central™ software suite comprising the Orchestrate™ platform. Workflow server 102 is configured to receive workflows created by workstation 101 and implement the workflows. Particularly, the workflows are implemented by analyzing events detected by systems 130-160 and executing appropriate actions. For example, assume a user creates a workflow on workstation 101 that has a trigger comprising surveillance system 140 detecting a loitering event, and has an action comprising notifying radios within public-safety network 130. When this workflow is uploaded to workflow server 102, workflow server 102 will notify the radios of any loitering event detected by surveillance system 140.

Public-safety network 130 is configured to detect various triggers and report the detected triggers to workflow server 102. Public-safety network 130 is also configured to receive action commands from workflow server 102 and execute the actions. In one embodiment of the present invention, public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from workflow server 102.

Video surveillance system 140 is configured to detect various triggers and report the detected triggers to workflow server 102. Video surveillance system 140 is also configured to receive action commands from workflow server 102 and execute the actions. In one embodiment of the present invention, video surveillance system 140 comprises a plurality of video cameras that may be configured to automatically change their field of views over time. Video surveillance system 140 is configured with a recognition engine/ video analysis engine (VAE) that comprises a software engine that analyzes any video captured by the cameras. Using the VAE, the video surveillance system 140 is capable of "watching" video or a live feed to detect any triggers and report the detected triggers to workflow server 102. In a similar manner, video surveillance system 140 is configured to execute action commands received from workflow server 102. In one embodiment of the present invention, video surveillance system 140 comprises an Avigilon™ Control Center (ACC) server having Motorola Solutions' Access Control Management (ACM)™ software suite.

Radio system 150 preferably comprises a private enterprise radio system that is configured to detect various triggers and report the detected triggers to workflow server 102. Radio system 150 is also configured to receive action commands from workflow server 102 and execute the actions. In one embodiment of the present invention, radio system 150 comprises a MOTOTRBO™ communication system having radio devices that operate in the CBRS spectrum and combines broadband data with voice communications.

Finally, access control system 160 comprises an IoT network. IoT system 160 serves to connect every-day devices to the Internet. Devices such as cars, kitchen appliances, medical devices, sensors, doors, windows, HVAC systems, drones, . . . , etc. can all be connected through the IoT. Basically, anything that can be powered can be connected to the internet to control its functionality. Access control system 160 allows objects to be sensed or controlled remotely across existing network infrastructure. For example, access control system 160 may be configured to provide access control to various doors and windows. With this in mind, access control system 160 is configured to detect various triggers (e.g., door opened/closed) and report the detected triggers to workflow server 102. Access control system 160 is also configured to receive action commands from workflow server 102 and execute the action received from workflow server 102. The action commands may take the form of instructions to lock, open, and/or close a door or window.

As is evident, the above security ecosystem 100 allows an administrator using workstation 101 to create rule-based, automated workflows between technologies to enhance efficiency, and improve response times, effectiveness, and overall safety. The above ecosystem 100 has the capabilities to detect triggers across a number of devices within network and systems 130-160 quickly take actions by automatically executing the proper procedure (i.e., executing the appropriate action once a trigger is detected).

Figure 1B:
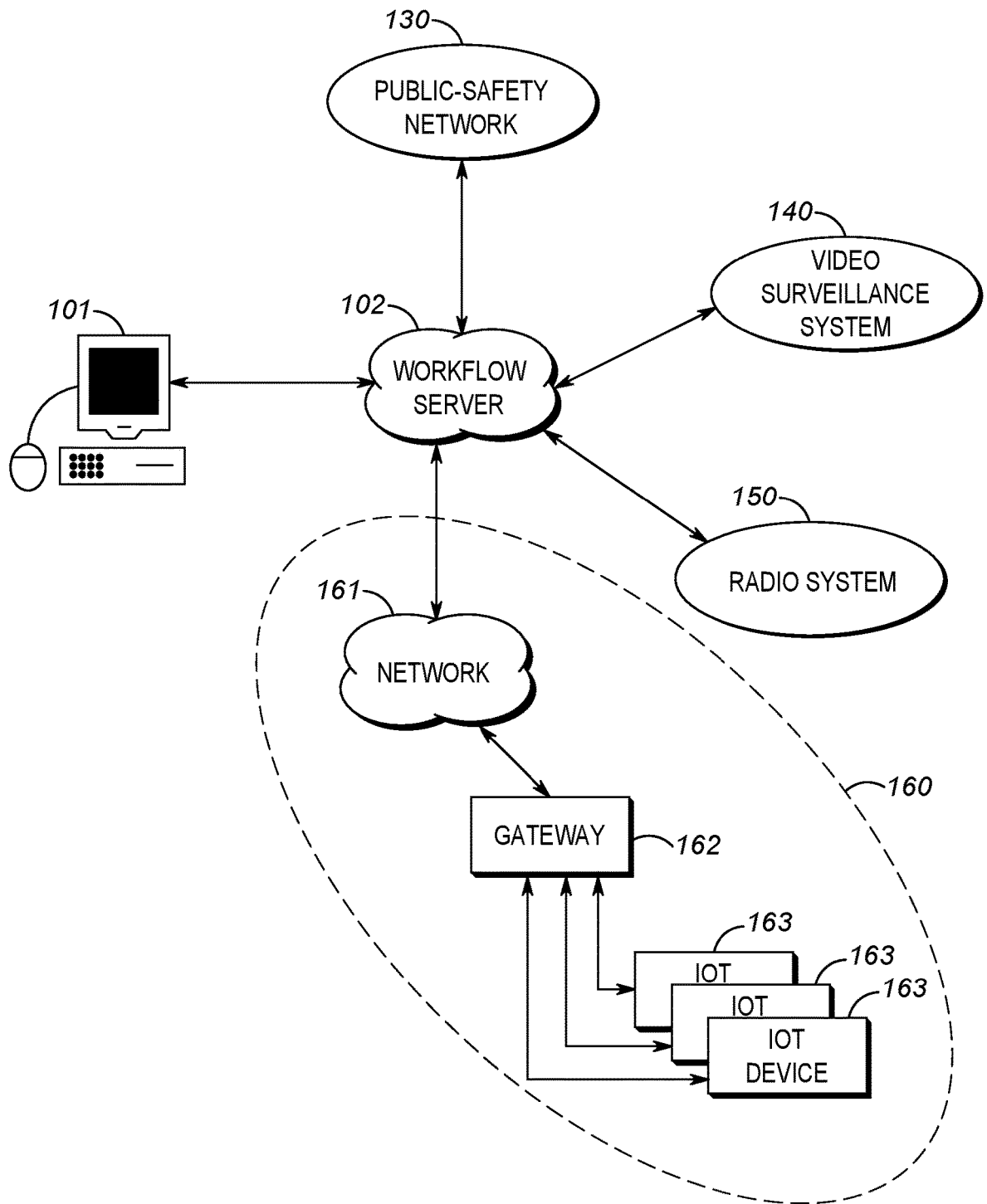
FIG. 1b illustrates a security ecosystem capable of configuring and automating workflows.

FIG. 1b illustrates a security ecosystem capable of configuring and automating workflows. In particular, FIG. 1b shows security ecosystem 100 with an expanded view of access control system 160. As shown, access control system 160 comprises a plurality of IoT devices 163 coupled to gateway 162. Data passed from workflow server 102 to IoT devices 163 passes through network 161, gateway 162 and ultimately to IoT device 163. Conversely, data passed from IoT devices 163 to workflow server 102 passes through gateway 162, network 161, and ultimately to workflow server 102.

IoT devices 163 preferably comprise devices that control objects, doors, windows, sensors, . . . , etc. As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

Gateway 162 preferably comprises an Avigilon™ Control Center running Avigilon's Access Control Management software. Gateway 162 is configured to run the necessary Application Program Interface (API) to provide communications between any IoT device 163 and workflow server 102.

Network 161 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Figure 1C:
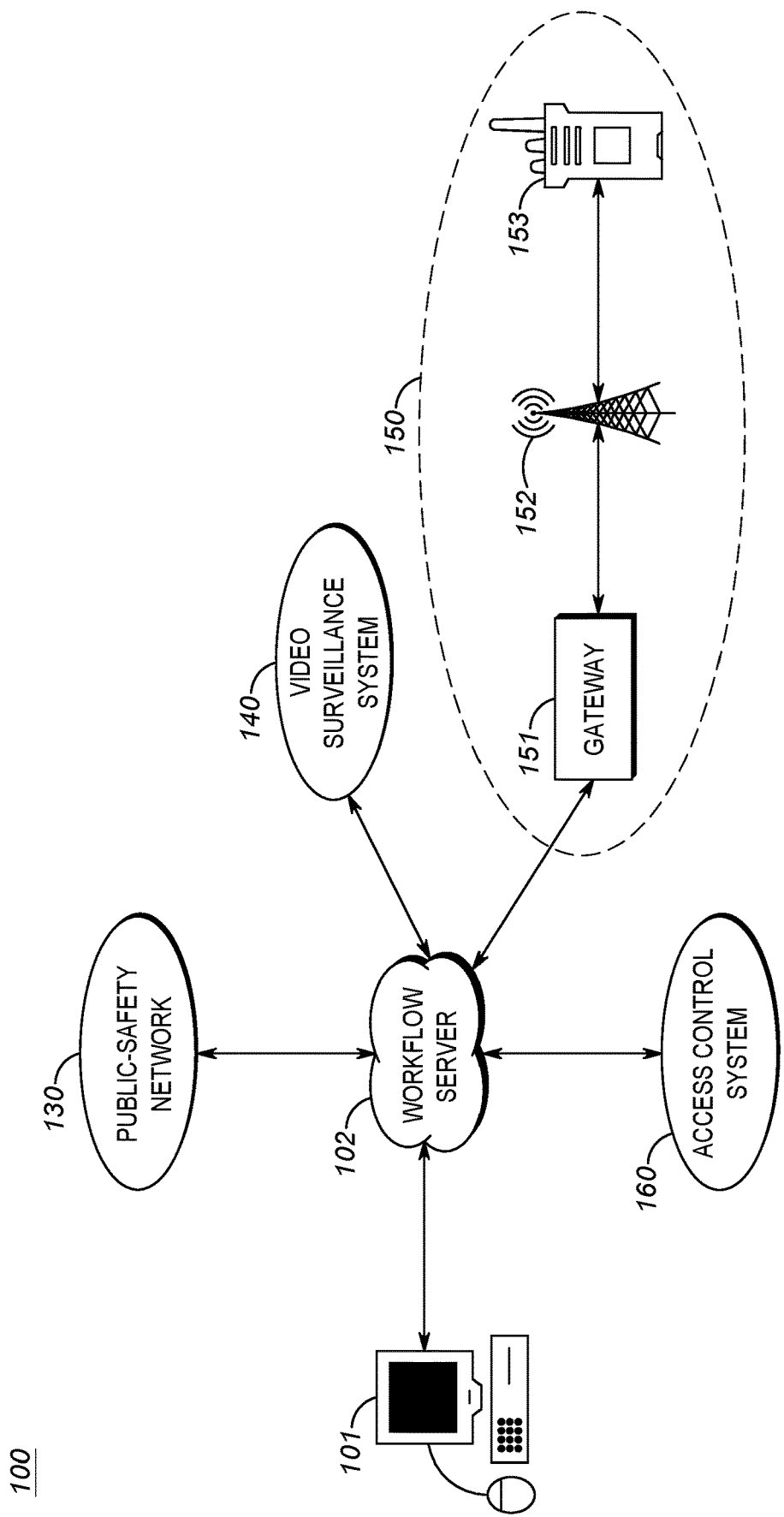
FIG. 1c illustrates a security ecosystem capable of configuring and automating workflows.

FIG. 1c illustrates a security ecosystem capable of configuring and automating workflows. In particular, FIG. 1c shows security ecosystem 100 with an expanded view of radio system 150. As shown, radio system 150 comprises gateway 151, system infrastructure 152, and at least one radio 153. Communications from radio 153 to workflow server 102 passes through infrastructure 152, gateway 151, and ultimately to workflow server 102.

Gateway 151 preferably comprises an Avigilon™ Control Center running Avigilon's Access Control Management software. Gateway 151 is configured to run the necessary Application Program Interface (API) to provide communications between any infrastructure 152 and workflow server 102.

Infrastructure 152 comprises the necessary equipment to provide wireless communications to and from radio 153. Preferably, infrastructure 152 comprises Motorola Solutions MOTOTRBO™ equipment, such as an SLR Series Repeater (e.g., SLR 1000, SLR 5000, or SLR8000 repeater) configured to provide two-way radio service to radio 153.

Although only a single radio 153 is shown in FIG. 1c, one of ordinary skill in the art will recognize that many radios 153 may be present within radio system 150. Each radio 153 preferably comprises a MOTOTRBO™ two-way radio (such as a Motorola Solution XPR 5000 Series radio) with digital technology providing integrated voice and data communication.

Figure 1D:
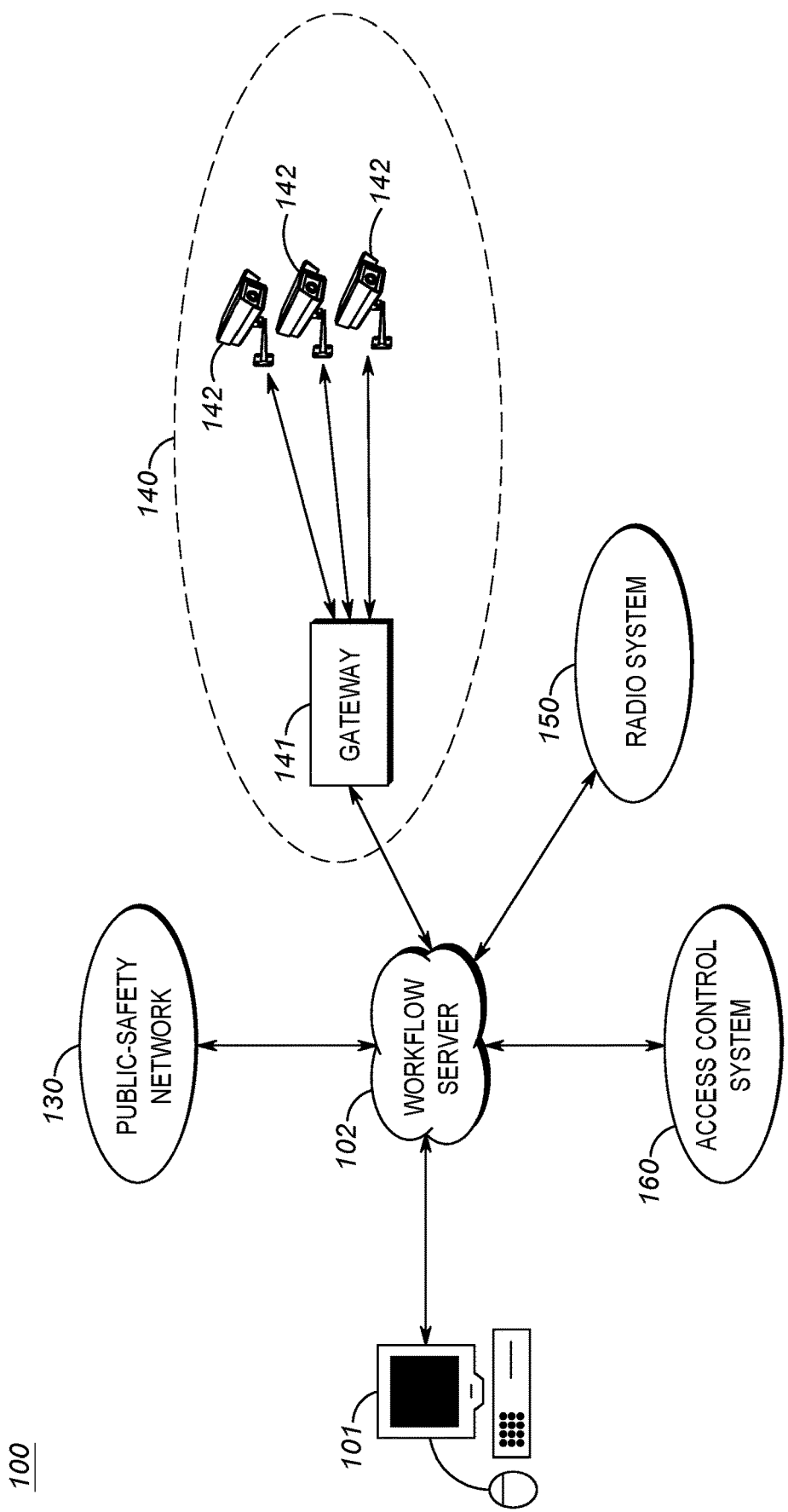
FIG. 1d illustrates a security ecosystem capable of configuring and automating workflows.

FIG. 1d illustrates a security ecosystem capable of configuring and automating workflows. In particular, FIG. 1d shows security ecosystem 100 with an expanded view of video surveillance system 140. As shown, video surveillance system 140 comprises a plurality of cameras 142 and gateway 141.

Cameras 142 may be fixed or mobile, and may have pan/tilt/zoom (PTZ) capabilities to change their field of view. Cameras 142 may also comprise circuitry configured to serve as a video analysis engine (VAE) which comprises a software engine that analyzes analog and/or digital video. The engine is configured to "watch" video and detect pre-selected objects such as license plates, people, faces, automobiles. The software engine may also be configured to detect certain actions of individuals, such as fighting, loitering, crimes being committed, . . . , etc. The VAE may contain any of several object/action detectors. Each object/action detector "watches" the video (which may include a live feed) for a particular type of object or action. Object and action detectors can be mixed and matched depending upon what is trying to be detected. For example, an automobile object detector VAE may be utilized to detect automobiles, while a fire detector VAE may be utilized to detect fires.

Gateway 141 preferably comprises an Avigilon™ Control Center running Avigilon's Access Control Management software. Gateway 141 is configured to run the necessary Application Program Interface (API) to provide communications between any cameras 142 and workflow server 102.

Figure 1E:
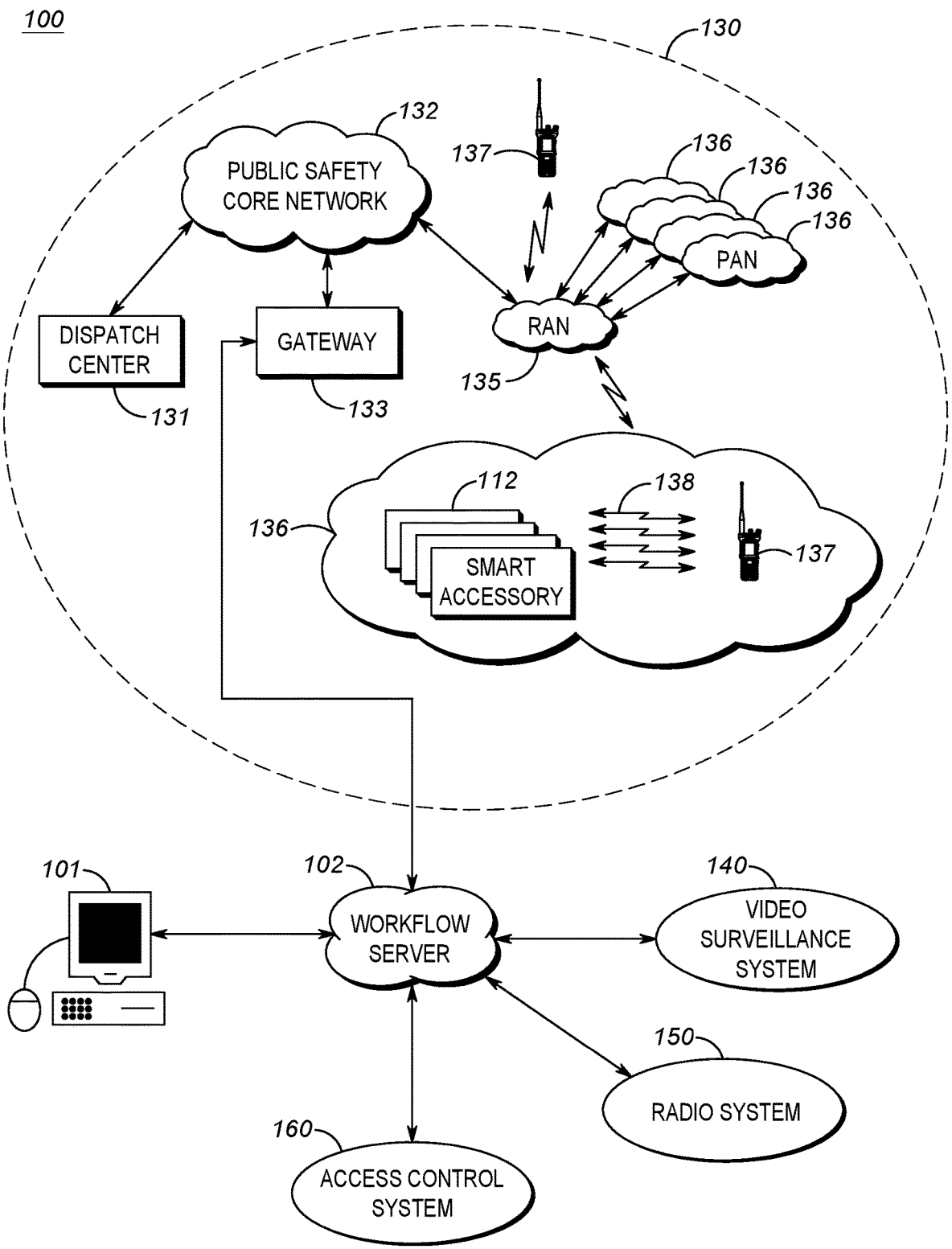
FIG. 1e illustrates a security ecosystem capable of configuring and automating workflows.

FIG. 1e illustrates a security ecosystem capable of configuring and automating workflows. In particular, FIG. 1e shows security ecosystem 100 with an expanded view of public safety network 130. As shown, public-safety network 130 comprises gateway 133, public-safety core network 132, dispatch center 131, radio access network (RAN) 135, at least one public-safety radio 137, and a plurality of personal-area networks (PANs) 136. As shown, each PAN 136 comprises radio 137 acting as a hub to smart devices/accessories 112.

Gateway 133 preferably comprises an Avigilon™ Control Center running Avigilon's Access Control Management software. Gateway 133 is configured to run the necessary Application Program Interface (API) to provide communications between public-safety core network 132 and workflow server 102.

A public safety officer (not shown in FIG. 1e) will be equipped with devices 112 that determine various physical and environmental conditions surrounding the public-safety officer. These conditions may be reported back to, for example, dispatch center 131 or workflow server 102 so an appropriate action may be taken. For example, future police officers may have a sensor 112 that determines when a gun is drawn. Upon detecting that an officer has drawn their gun, a notification may be sent back to the dispatch operator and/or workflow server 102 so that, for example, other officers in the area may be notified of the situation.

It is envisioned that the public-safety officer will have an array of these shelved devices 112 available to the officer at the beginning of a shift. The officer will select devices 112 off the shelf, and form a personal area network (PAN) with the devices that will accompany the officer on their shift. For example, the officer may pull a gun-draw sensor, a body-worn camera, a wireless microphone, a smart watch, a police radio, smart handcuffs, a man-down sensor, a biosensor, . . . , etc. All devices 112 pulled by the officer will be configured to form a PAN by associating (pairing) with each other and communicating wirelessly among the devices. At least one device may be configured with a digital assistant. In a preferred embodiment, the PAN comprises more than two devices, so that many devices may be connected via the PAN simultaneously.

A method called bonding is typically used for recognizing specific devices 112 and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device. Thus, as shown, public-safety communication system 130 incorporates PANs 136 created as described above. In a preferred embodiment of the present invention, radios 137 and devices 112 form PAN 136, with communication links 138 between devices 112 and radios 137 taking place utilizing a short-range communication system protocol such as a Bluetooth communication system protocol. In this particular embodiment, a pan will be associated with a single officer. Thus, FIG. 1e illustrates multiple PANs 136 associated with multiple officers (not shown).

RAN 135 includes typical RAN elements such as base stations, base station controllers (BSCs), routers, switches, and the like, arranged, connected, and programmed to provide wireless service to user equipment (e.g., radios 137, and the like) in a manner known to those of skill in the relevant art. RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 135 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 135 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 132 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 132 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radios 137 serves as a PAN main device, and may be any suitable computing and communication device configured to engage in wireless communication with the RAN 135 over the air interface as is known to those in the relevant art. Moreover, one or more radios 137 are further configured to engage in wired and/or wireless communication with one or more local device 112 via the communication link 138. Radios 137 will be configured to determine when to forward information received from PAN devices to, for example, a dispatch center or workflow server 102. Some examples follow of devices 112 are a sensor-enabled holster, a biometric sensor, an accelerometer, a heart rate sensor, and a breathing rate sensor.

Dispatch center 131 comprises, or is part of, a computer-aided-dispatch center (sometimes referred to as an emergency-call center, Security Operations Center (SOC), or public-safety answering point), that may be manned by an operator providing necessary dispatch operations. For example, dispatch center 131 typically comprises a graphical-user interface that provides the dispatch operator necessary information about public-safety officers. As discussed above, some of this information originates from devices 112 providing information to radios 137, which forwards the information to RAN 135 and ultimately to dispatch center 131.

In a similar manner information about public-safety officers may be provided to workflow server 102. This information originates from devices 112 providing information to radios 137, which forwards the information to RAN 135 and ultimately to workflow server 102 via core network 132 and gateway 133. For example, a gun-draw sensor 112 may send an indication to workflow server 102 that a gun has been drawn. This may serve as a "trigger" for workflow server 102 to initiate a particular "action", for example, notifying surrounding officers (for example on a particular talkgroup) by having their radios 137 provide an alarm indicating the triggering event. Thus, workflow server 102 may provide instructions to any device 112 or radio 137 by sending an "action" to devices 112 in response to a trigger being received.

Figure 2:
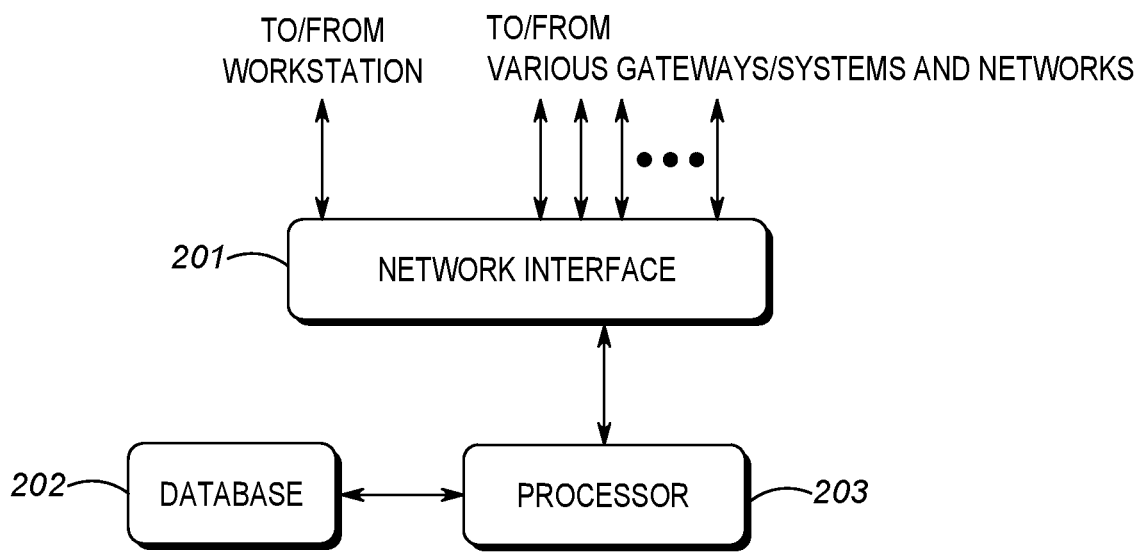
FIG. 2 is a block diagram of a workflow server of FIG. 1.

FIG. 2 is a block diagram of a workflow server of FIG. 1. As shown, workflow server 102 comprises network interface 201, database 202, and processor (serving as logic circuitry) 203.

Network interface 201 includes elements including processing, modulating, and transceiver elements that are operable in accordance with any one or more standard or proprietary wireless interfaces, wherein some of the functionality of the processing, modulating, and transceiver elements may be performed by means of processor 203 through programmed logic such as software applications or firmware stored on the storage component 202 (e.g., standard random access memory) or through hardware. Examples of network interfaces (wired or wireless) include Ethernet, T1, USB interfaces, IEEE 802.11b, IEEE 802.11g, etc.

Logic circuitry 203 comprises a digital signal processor (DSP), general purpose microprocessor, a programmable logic device, or application specific integrated circuit (ASIC) and is configured to receive triggers from various gateways, systems, and networks. Once a trigger is received, logic circuitry 203 is configured to execute (or cause to be executed) a particular action associated with the trigger. More particularly, when logic circuitry 203 receives a notification that a trigger has been detected from any attached network or system, logic circuitry will access database 202 to determine an action (if any) for the particular trigger. If an action has been determined that is associated with the trigger, logic circuitry 203 will execute the action, or cause the action to be executed. In order to perform the above, logic circuitry executes an instruction set/software (e.g., Motorola Solutions' Command Central™ software suite comprising the Orchestrate™ platform) stored in database 202.

Database 202 comprises standard memory (such as RAM, ROM, . . . , etc) and serves to store associations between triggers and actions. This is illustrated in Table 1, below.

TABLE 1

Associations Between Triggers and Actions.

| Trigger | Action |
|---|---|
| Warehouse back door opened | Pan camera 342 to point at door |
| Man-Down sensor activated for Officer Smith | Notify dispatch center via emergency text message |

TABLE 1-continued

Associations Between Triggers and Actions.

| Trigger | Action |
| --- | --- |
| ALPR for delivery truck | Open back gate |
| . . . etc. | . . . etc. |

Figure 3:
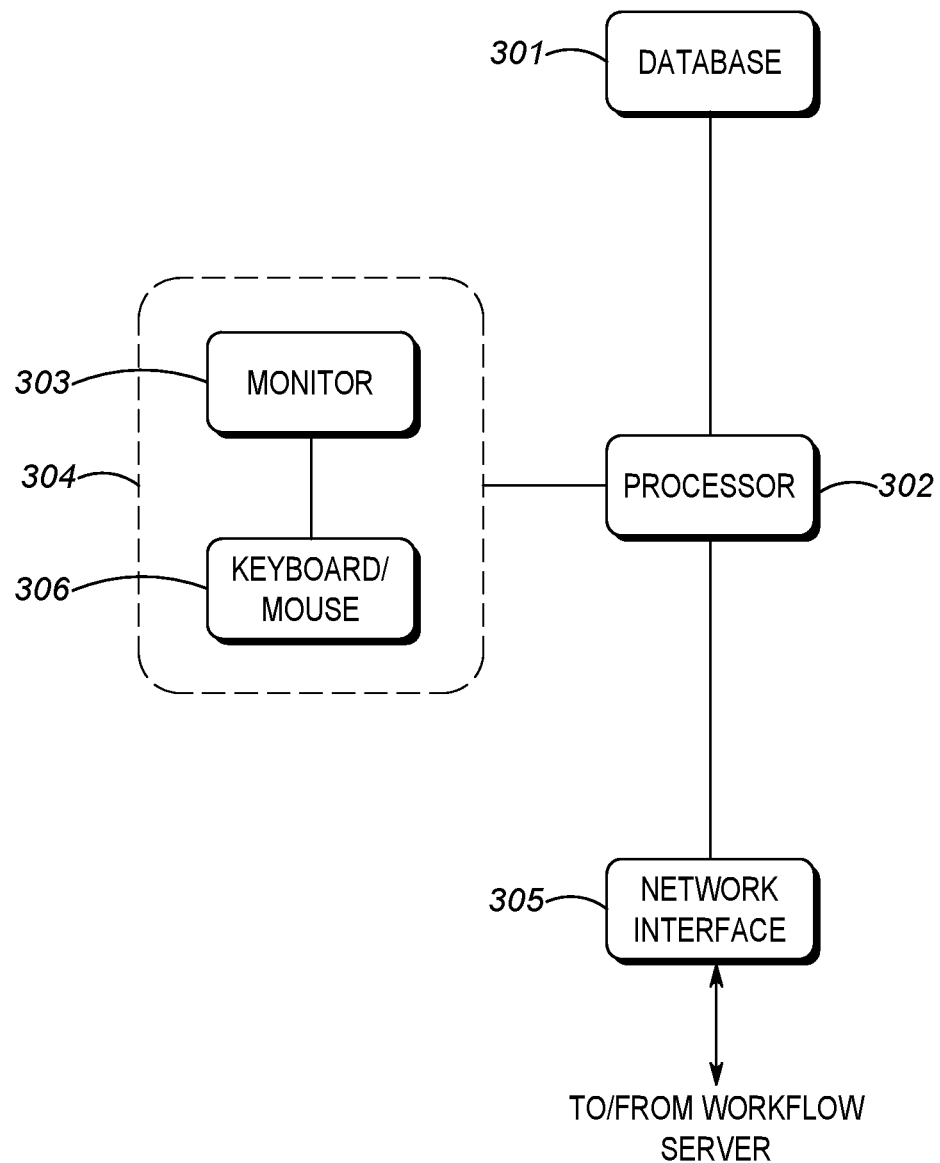
FIG. 3 is a block diagram of a workstation of FIG. 1 utilized to create a workflow.

FIG. 3 is a block diagram of a workstation of FIG. 1 utilized to create a workflow. As shown, workstation 101 comprises database 301, processor 302, graphical-user interface 304, and network interface 305.

Network interface 305 includes elements including processing, modulating, and transceiver elements that are operable in accordance with any one or more standard or proprietary wireless interfaces, wherein some of the functionality of the processing, modulating, and transceiver elements may be performed by means of processor 302 through programmed logic such as software applications or firmware stored on the storage component 301 (e.g., standard random access memory) or through hardware. Examples of network interfaces (wired or wireless) include Ethernet, T1, USB interfaces, IEEE 802.11b, IEEE 802.11g, etc.

Logic circuitry 302 comprises a digital signal processor (DSP), general purpose microprocessor, a programmable logic device, or application specific integrated circuit (ASIC) and is configured to execute Motorola Solutions' Orchestrate™ and Ally™ dispatch and incident management software from storage 301. The execution of such software will allow users of GUI 304 to create workflows (i.e., actions and their associated responses) by receiving user inputs from GUI 304 that define various triggers and their associated actions, which will ultimately be uploaded to workflow server 102 and stored in database 202.

Database 301 comprises standard memory (such as RAM, ROM, . . . , etc) and serves to store instructions as software. Particularly, Motorola Solutions' Orchestrate™ and Ally™ dispatch and incident management software is stored in database 301.

GUI 304 provides a man/machine interface for receiving an input from a user and displaying information. For example, GUI 304 provides a way of conveying (e.g., displaying) user-created workflows. Thus, GUI 304 also provides means for a user to input workflows into a displayed form. In order to provide the above features (and additional features), GUI 304 may comprise any combination of monitor 303 (e.g., touch screen, a computer screen, . . . , etc.) and keyboard/mouse combination 306.

Figure 4:
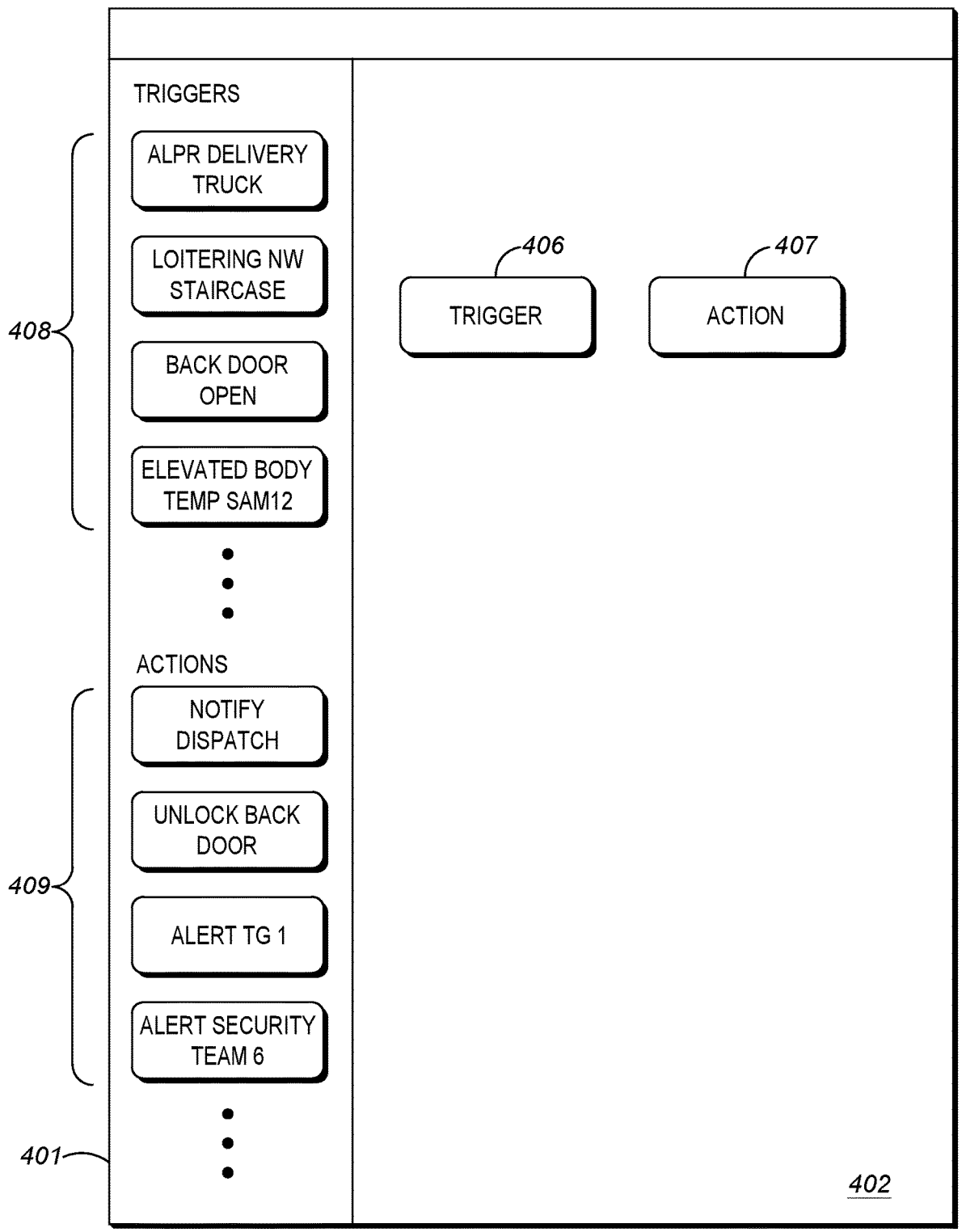
FIG. 4 illustrates the creation of a workflow.

FIG. 4 illustrates the creation of a workflow. More particularly, FIG. 4 illustrates a dashboard displayed on monitor 303 utilized for the creation of workflows. The dashboard consists of the following main elements:

- selection pane 401 on the left-hand side, which comprises the available triggers 408 and actions 409;
- workspace 402, which comprises the area in the middle of the dashboard used to create workflows that define the connections between triggers and actions. Each trigger and action in the workspace is displayed as a separate field 406 and 407 with an outline and a title. As shown in FIG. 4, two fields 406 and 407 are shown, one labeled "trigger" and another labeled "action".

Triggers 408 represent the detected events originating from various sensors, software, and devices within security ecosystem 100. Actions 409 represent the possible responses to the triggers. A workflow comprises at least one trigger and at least one action.

After a workflow is deployed (i.e., uploaded to workflow server 102), its actions execute when the triggers occur (are detected). Triggers and actions appear on the workspace after they are dragged and dropped from the triggers 408 and actions 409 areas respectively. Connecting the triggers and actions on the workspace (as described below) will create a workflow.

All triggers 408 and actions 409 are stored in database 301 and represent integrations across multiple products. In other words, triggers and actions comprise triggers and actions for all of the components available in security ecosystem 100. This includes cameras, sensors, IoT devices, radios, . . . , etc. As administrators add additional technology pieces to security ecosystem 100, those pieces are automatically made available for workflow creation as discussed herein.

In order to associate a trigger with an action, a user selects a trigger from all possible triggers 408, and drags and drops it onto workspace area 402. The user then selects an action for the trigger, and drags and drops it onto workspace area 402. In order to associate the trigger with the action, they are connected. To connect the trigger and actions, a user will click the end of one of the node, and drag a line to the other node.

Figure 5:
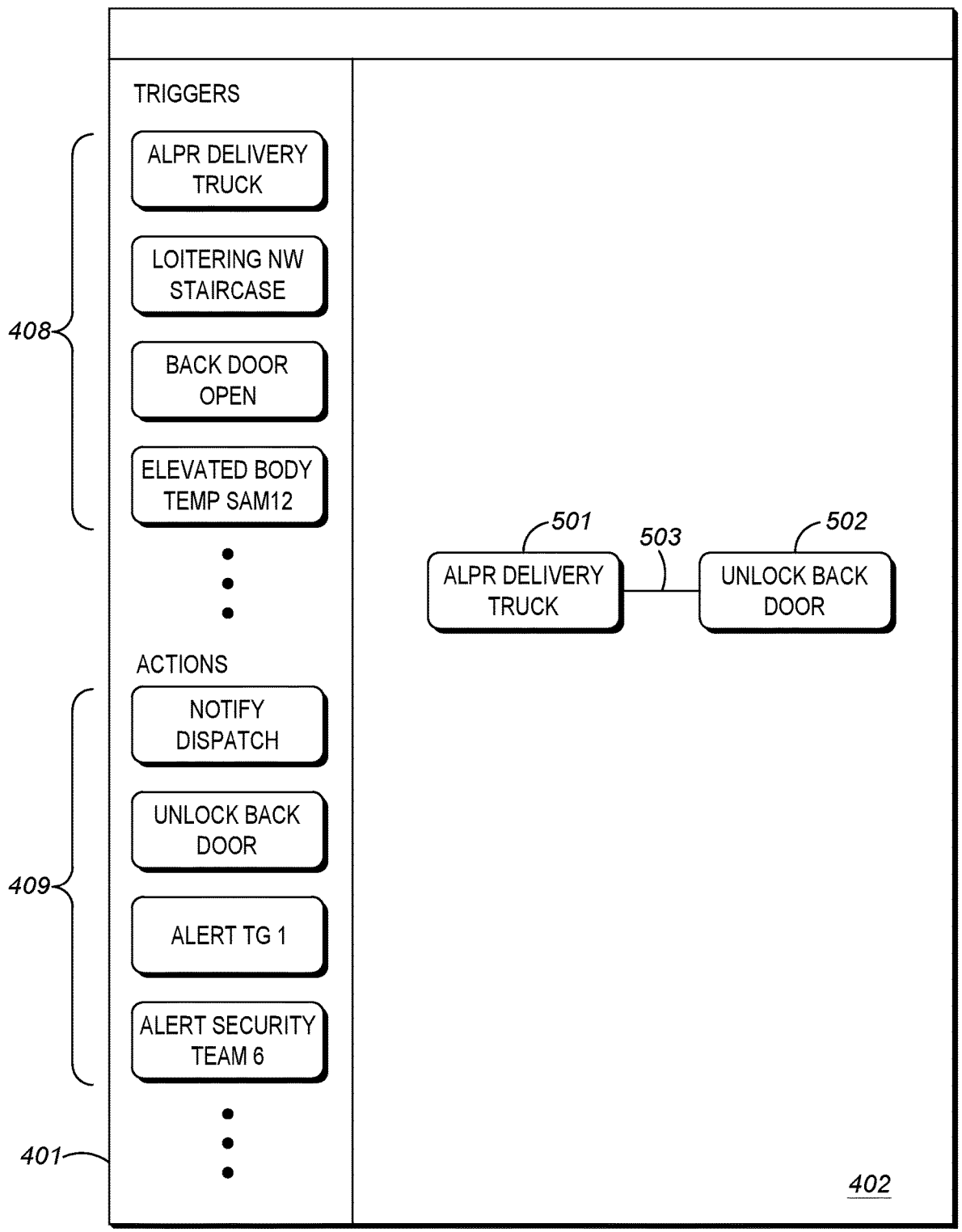
FIG. 5 illustrates the creation of a workflow.

As shown in FIG. 5, a trigger "ALPR delivery truck" 501 has been associated with an action "unlock back door" 502 by dragging line 503 between the two. If any of the triggers occurs (are detected), the action(s) is executed. Sometimes this is referred to as the "workflow being executed".

Figure 6:
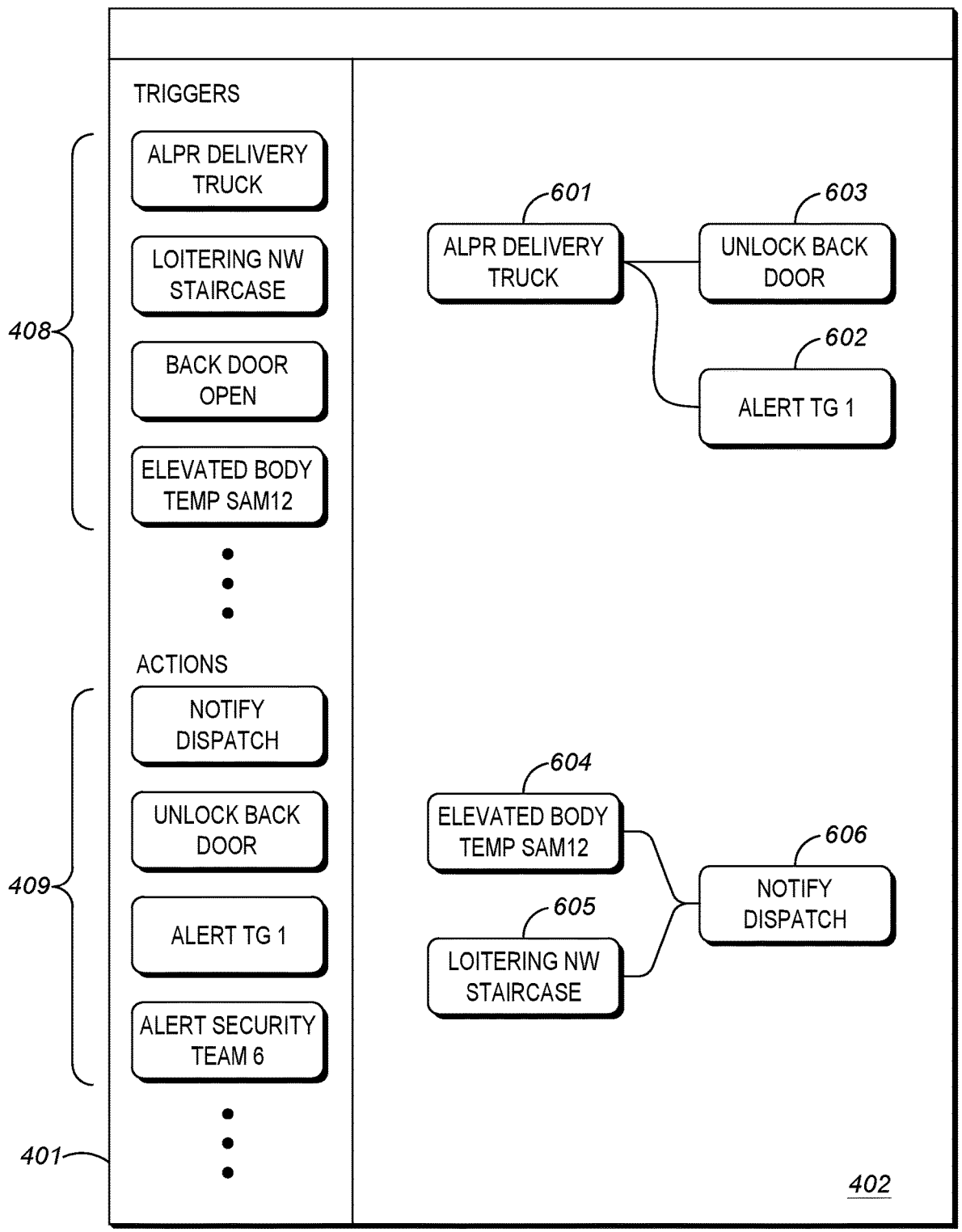
FIG. 6 illustrates the creation of a workflow.

As illustrated in FIG. 6, a workflow may comprise a single trigger that is associated with multiple actions. Thus, the trigger "ALPR delivery truck" 601 may be associated with action "unlock back door" 603 as well as associated with "alert TG 1" 602. When this workflow is uploaded to workflow server 102, the automatic license plate detected for the delivery truck will cause both the back door to unlock and an alert to be sent on talkgroup #1.

In a similar manner a workflow may comprise multiple triggers associated with a single action. Thus, both the triggers "elevated body tem SAM 12" 604 or "loitering NW staircase" will cause the action of "notify dispatch" 606. Thus, when officer SAM 12 has an elevated body temperature dispatch is notified, and when loitering is detected in the NW staircase, dispatch is notified.

In a similar manner, if one trigger is dragged and dropped onto another trigger, a new trigger is created that defaults to a logical "AND" and comprises both triggers connected with the logical "AND". For example, if a user places a trigger "door ajar" onto the workspace, and the trigger of "loitering detected" is dragged over the trigger of "door ajar" then a single trigger of "loitering detected AND door ajar" is created. The user can then change the logical AND to a logical OR, AND NOT, WHILE, . . . , etc.

As mentioned above, users can create and implement a workflow by associating a trigger with a particular action, a trigger with multiple actions, or multiple triggers with an action. Once one of the triggers is detected (triggered), the associated action is executed. A workflow being "executed" is considered at least one trigger that causes an action to be executed.

When a workflow is executed, a user who is the subject of the action may request more information on the triggering event. In many instances, this "request" may comprise a query to an electronic digital assistant. Electronic digital assistants may provide the user with valuable information in response to a query directed to the digital assistant. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information.

As some existing examples, electronic digital assistants such as Siri provided by Apple, Inc.® Google Now provided by Google, Inc.®, Alexa provided by Amazon Inc.® are software applications running on underlying electronic hardware that are capable of understanding natural language, and may complete electronic tasks in response to user voice inputs, among other additional or alternative types of inputs. These electronic digital assistants may perform such tasks as looking up requested information, and providing the information to the requestor.

In order to provide suggested workflows to a user, electronic digital assistant circuitry is utilized to notify server 102 of any digital assistant query. The notification comprises a source of the query and a time of the query. Processor 203 can then check to see if any executed workflow matches the time period of the digital assistant query (e.g., within 30 seconds). Processor 203 can also check to determine if any person within the action of the workflow made the query. If a person within the action of a workflow made the query within a predetermined time period of the workflow being executed, then a suggested modification to the workflow is sent to workstation 101 and presented on monitor 303. The suggested modification of the workflow modifies the action of the workflow to include the requested information.

As an example of the above, consider a workflow that comprises a trigger of "loitering detected at door 4", and an action of "notify security team A". Assume that the trigger has been detected, and that security team A has been notified of the loitering. If someone belonging to security team A requests more information on the detected trigger from a digital assistant, (e.g., requests a number of individuals detected by door 4), this information will be provided to processor 203 via network interface 201. Processor 203 will check to see if any member of security team A has made the query, and also check to see if the query was executed within a predetermined time of the workflow being executed. If both are true, a suggestion will be made to modify the trigger to automatically provide information included in the result of the query upon subsequent execution of the workflow.

Figure 7:
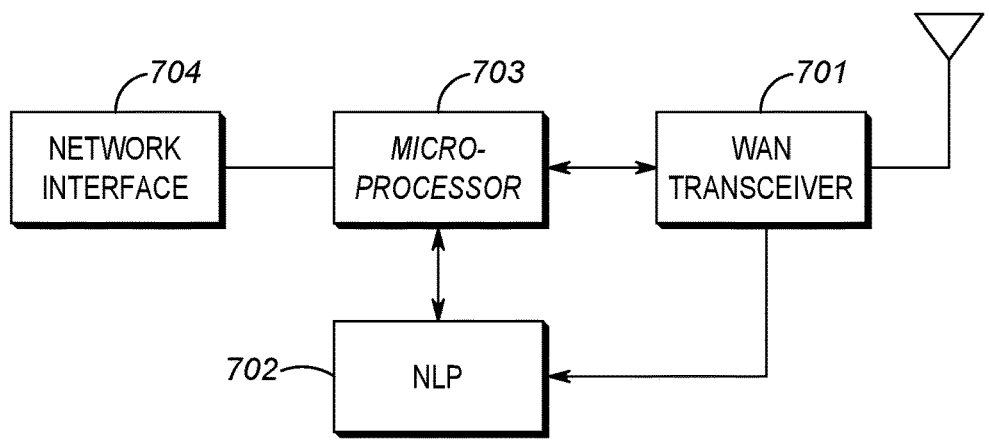
FIG. 7 illustrates digital-assistant circuitry.

In order to accomplish this, all radios within networks 130 and 150 are allowed to access digital assistant circuitry located within public-safety core network 132 and infrastructure 152. The electronic-digital assistant circuitry is shown in FIG. 7. Although it was stated that the circuitry of FIG. 7 is contained within components 132 and 152, in alternate embodiments the device may be embodied within a cloud compute cluster (not shown), radios, or some other communication device not illustrated in FIG. 1, and/or may be a distributed communication device across two or more entities.

FIG. 7 shows those components (not all necessary) for infrastructure to provide digital-assistant functionality. Thus, infrastructure 132 and 152 may include a wide-area-network (WAN) transceiver 701 (e.g., a transceiver that utilizes a public-safety or private communication-system protocol), Natural Language Processor (NLP) 702, network interface 704, and logic circuitry 703 (which may serve as a digital assistant).

WAN transceiver 701 may comprise well known long-range transceivers that utilize any number of network system protocols. (As one of ordinary skill in the art will recognize, a transceiver comprises both a transmitter and a receiver for transmitting and receiving data). For example, WAN transceiver 701 may be configured to utilize a next-generation cellular communications protocol operated by a cellular service provider, or any public-safety protocol such as an APCO 25 network or the FirstNet broadband network. WAN transceiver 701 receives communications from officers using radios within network 130 or system 150.

NLP 702 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Logic circuitry 703 comprises a digital signal processor (DSP), general purpose microprocessor, a programmable logic device, or application specific integrated circuit (ASIC) and is configured along with NLP 702, to serve as a digital assistant/virtual partner in order to provide answers to queries. For example, logic circuitry 703 may provide the user thereof with valuable information in response to queries by accessing databases (not shown) via network interface 704, or by accessing any equipment within system 100. The valuable information provided to the user may be based on explicit requests for such information posed by the user in which the electronic digital assistant may reactively provide such requested valuable information.

Logic circuitry 703 is also configured to provide workflow server 102 with information on any query made by a user through network interface 704, which passes this information through gateways and ultimately to workflow server 102. As discussed, this information comprises an identification of a user who made the query, a time of the query, and the query along with the valuable information included in the answer to the query. Once such information is received, processor 203 accesses database 202 to determine if any workflows have been accessed within a predetermined period of time, and if so, determines if the person making the query is a subject of the "action" of the workflow. If so, a new workflow will be suggested that includes instructions to provide the valuable information to the user when the workflow is executed.

Consider the above example of the workflow that detects if loitering is detected (trigger) and notifies security team A (action). If someone on security team A, in response to the action/notification requests more information (e.g., how many individuals are loitering), this information can be provided to processor 203 and a proposed workflow can be presented to a user so that this information can be provided to a user upon future executions of the workflow. This is illustrated in FIG. 8.

Figure 8:
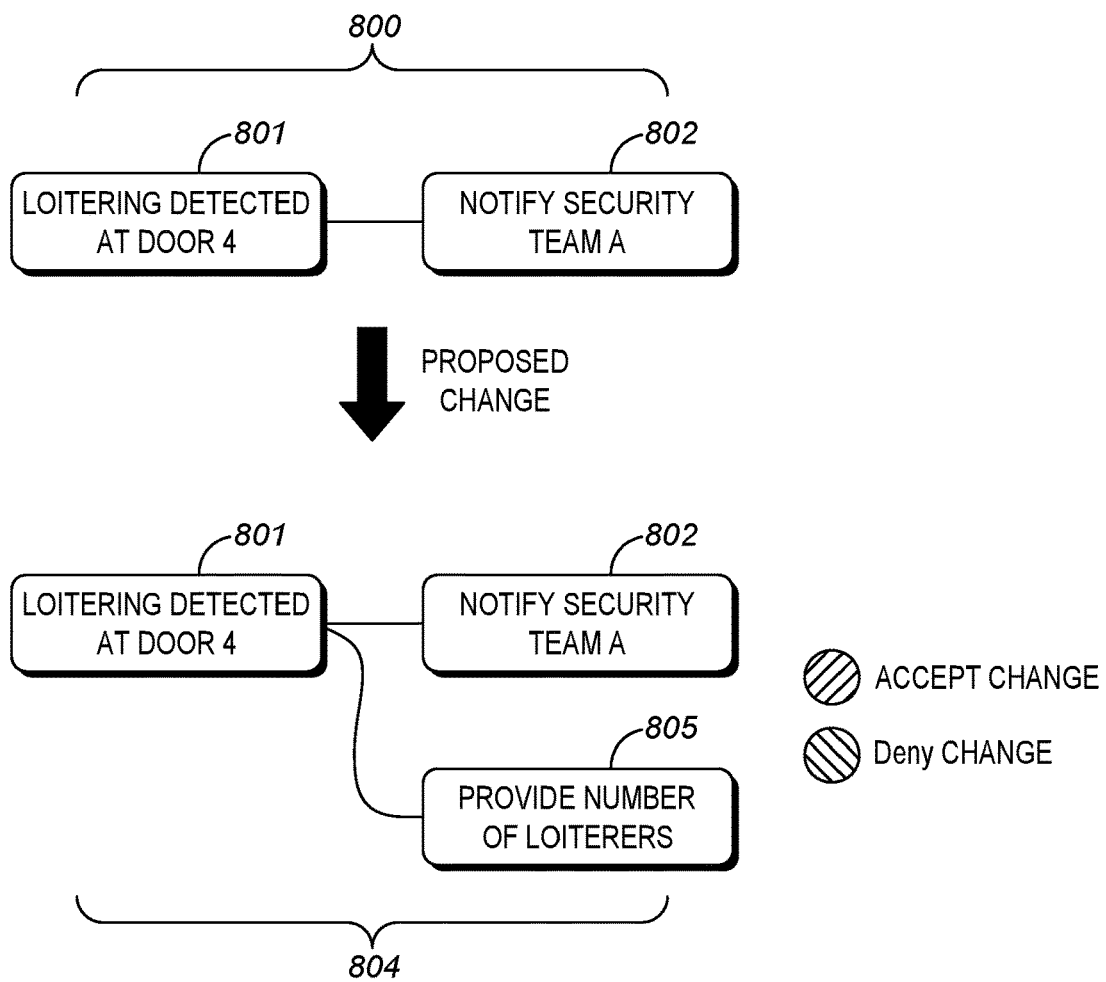
FIG. 8 illustrates a new workflow presented to a user.

As shown in FIG. 8, a user, using workstation 101, creates user-created workflow 800 having trigger 801 and action 802. The trigger comprises "loitering detected at door 4", while the action comprises "notify security team A". Within a predetermined time period of the execution of workflow 800, a member of security team A requested (via a digital assistant) that a number of loiterers be provided. Because a person within the action of workflow 800 requested information via a digital assistant within a predetermined time (e.g., 30 seconds) after execution of workflow 800, a proposed change to the workflow is provided to the user by server 102. As is evident, the proposed workflow change includes new "action" 805 that requires a number of loiterers to be provided to the user upon the next detection of loitering at door 4. Thus, in the example shown in FIG. 8, logic circuitry 203 determined that execution of the workflow resulted in a request by a person included in the "action" for the number of loiterers to be provided. Logic circuitry 203 determined that the request was made within a predetermined time period of the workflow being executed. Because of this, new workflow 804 is suggested.

With the above in mind, workflow server 102 comprises An apparatus comprising processor 203 configured to cause a workflow to be executed, wherein the workflow comprises a trigger and at least one action, wherein triggers represent detected events originating from various sensors/cameras within a security ecosystem, wherein actions represent possible responses to the detected events, and wherein once the trigger is detected, the at least one action is executed. Network interface 201 is provided, and configured to receive an indication that a user made a query to an electronic digital assistant at a particular time.

As discussed, processor 203 is also configured to receive the indication that the user made the query to the electronic digital assistant requesting information, determine that a person that is a subject of the action of the executed workflow is a same person that made the query to the electronic digital assistant, determine that the query to the electronic digital assistant was made within a predetermined time period from when the workflow was executed, and modify, or suggest a modification to the executed workflow by changing or adding the requested information to the action of the executed workflow, causing the requested information to automatically be provided to the user upon subsequent executions of the workflow.

Processor 203 is also configured to send the modification or suggested modification of the executed workflow to a graphical-user interface.

Figure 9:
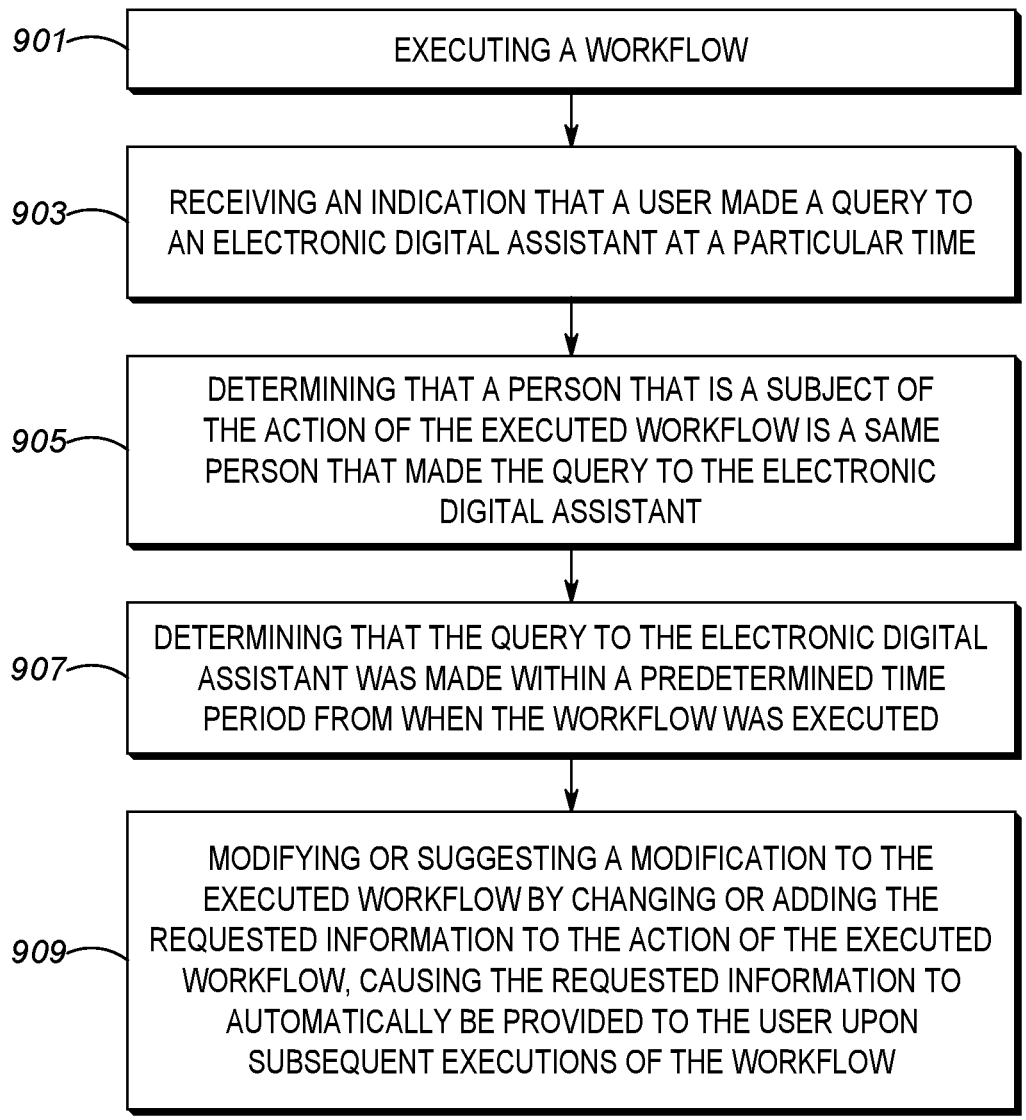
FIG. 9 is a flow chart showing operation of the workflow server and workstation of FIG. 1.

FIG. 9 is a flow chart showing operation of workstation 101 and server 102. The logic flow begins at step 901 where processor 203 causes a workflow to be executed. As discussed, the workflow comprises a trigger and at least one action, wherein triggers represent detected events originating from various sensors/cameras within a security ecosystem, wherein actions represent possible responses to the detected events, and wherein once the trigger is detected, the at least one action is executed.

At step 903, processor 203 receives an indication that a user made a query to an electronic digital assistant at a particular time, the query requesting information and at step 905 determines that a person that is a subject of the action of the executed workflow is a same person that made the query to the electronic digital assistant. At step 907, processor 203 determines that the query to the electronic digital assistant was made within a predetermined time period from when the workflow was executed, and at step 909, processor 203 modifies or suggests a modification to the executed workflow by changing or adding the requested information to the action of the executed workflow, causing the requested information to automatically be provided to the user upon subsequent executions of the workflow.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a processor configured to cause a workflow to be executed, wherein the workflow comprises a trigger and at least one action, wherein triggers represent detected events originating from various sensors/cameras within a security ecosystem, wherein actions represent possible responses to the detected events, wherein once the trigger is detected, the at least one action is executed, and wherein the at least one action comprises at least one subject that receives a notification when the at least one action is executed;
a network interface configured to receive an indication that a user made a query to an electronic digital assistant at a particular time; and
wherein the processor is also configured to:
receive the indication that the user made the query to the electronic digital assistant requesting information;
determine if the at least one subject that receives a notification when the at least one action is executed includes the user that made the query to the electronic digital assistant;
determine if the query to the electronic digital assistant was made within a predetermined time period after the workflow was executed; and
modify, or suggest a modification to, the executed workflow based on the query only when it is determined that (i) the at least one subject that receives a notification when the at least one action is executed includes the user that made the query to the electronic digital assistant and (ii) the query to the electronic digital assistant was made within the predetermined time period after the workflow was executed, and wherein the modification to the executed workflow comprises changing or adding the requested information to the action of the executed workflow, thereby causing the requested information to automatically be provided to the user upon subsequent executions of the workflow.

2. The apparatus of claim 1 wherein the processor is also configured to send the modification or suggested modification of the executed workflow to a graphical-user interface.

3. A method comprising the steps of:
executing a workflow, wherein the workflow comprises a trigger and at least one action, wherein triggers represent detected events originating from various sensors/cameras within a security ecosystem, wherein actions represent possible responses to the detected events, [and] wherein once the trigger is detected, the at least one action is executed, and wherein the at least one action comprises at least one subject that receives a notification when the at least one action is executed;
receiving an indication that a user made a query to an electronic digital assistant at a particular time, the query requesting information;
determining if the at least one subject that receives a notification when the at least one action is executed includes the user that made the query to the electronic digital assistant;
determining if the query to the electronic digital assistant was made within a predetermined time period after the workflow was executed; and
modifying, or suggesting a modification to, the executed workflow based on the query only when it is determined that (i) the at least one subject that receives a notification when the at least one action is executed includes the user that made the query to the electronic digital assistant and (ii) the query to the electronic digital assistant was made within the predetermined time period after the workflow was executed, and wherein the modification to the executed workflow comprises changing or adding the requested information to the action of the executed workflow, thereby causing the requested information to automatically be provided to the user upon subsequent executions of the workflow.

4. The method of claim 3 further comprising the step of:
sending the modification or suggested modification of the executed workflow to a graphical-user interface.

5. A security ecosystem comprising:
an electronic digital assistant;
a workstation comprising a graphical-user interface; and
a workflow server comprising:
a processor configured to cause a workflow to be executed, wherein the workflow comprises a trigger and at least one action, wherein triggers represent detected events originating from various sensors/cameras within a security ecosystem, wherein actions represent possible responses to the detected events, wherein once the trigger is detected, the at least one action is executed, and wherein the at least one action comprises at least one subject that receives a notification when the at least one action is executed;
a network interface configured to receive an indication that a user made a query to the electronic digital assistant at a particular time; and
wherein the processor is also configured to:
receive the indication that the user made the query to the electronic digital assistant requesting information;
determine if the at least one subject that receives a notification when the at least one action is executed includes the user that made the query to the electronic digital assistant;

determine if the query to the electronic digital assistant was made within a predetermined time period after the workflow was executed;

modify, or suggest a modification to, the executed workflow based on the query only when it is determined that (i) the at least one subject that receives a notification when the at least one action is executed includes the user that made the query to the electronic digital assistant and (ii) the query to the electronic digital assistant was made within the predetermined time period after the workflow was executed, and wherein the modification to the executed workflow comprises changing or adding the requested information to the action of the executed workflow, thereby causing the requested information to automatically be provided to the user upon subsequent executions of the workflow; and send the modification or suggested modification of the executed workflow to the graphical-user interface.

* * * * *